(12) United States Patent
Uramachi et al.

(10) Patent No.: US 8,347,707 B2
(45) Date of Patent: Jan. 8, 2013

(54) FLOW RATE MEASURING APPARATUS

(75) Inventors: Hiroyuki Uramachi, Tokyo (JP); Koji Tanimoto, Tokyo (JP); Yuji Ariyoshi, Tokyo (JP); Masahiro Kawai, Tokyo (JP); Shinichiro Hidaka, Tokyo (JP); Naoyuki Kishikawa, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 169 days.

(21) Appl. No.: 13/043,992

(22) Filed: Mar. 9, 2011

(65) Prior Publication Data
US 2012/0103107 A1 May 3, 2012

(30) Foreign Application Priority Data
Nov. 1, 2010 (JP) .................. 2010-244910

(51) Int. Cl.
*G01F 1/68* (2006.01)
(52) U.S. Cl. .................. 73/204.22
(58) Field of Classification Search .............. 73/202, 73/202.5, 204.11–204.27
See application file for complete search history.

(56) References Cited

U.S. PATENT DOCUMENTS

| | | | | |
|---|---|---|---|---|
| 6,516,785 | B1 * | 2/2003 | Nakada et al. | 123/494 |
| 6,612,167 | B2 * | 9/2003 | Kamiya | 73/204.22 |
| 6,640,627 | B2 * | 11/2003 | Sato et al. | 73/204.22 |
| 6,666,082 | B2 * | 12/2003 | Watanabe et al. | 73/204.22 |
| 6,708,560 | B2 * | 3/2004 | Watanabe et al. | 73/204.22 |
| 6,912,899 | B2 * | 7/2005 | Satou et al. | 73/204.22 |
| 7,219,544 | B2 * | 5/2007 | Tanaka et al. | 73/204.26 |
| 2002/0069699 | A1 * | 6/2002 | Sato et al. | 73/204.22 |

FOREIGN PATENT DOCUMENTS

JP 2009-8619 A 1/2009

* cited by examiner

*Primary Examiner* — Jewel V Thompson
(74) *Attorney, Agent, or Firm* — Sughrue Mion, PLLC

(57) ABSTRACT

Provided is a flow rate measuring apparatus which suppresses deformation of a base main body due to vibration of a pipe so as to be able to reduce occurrence of disconnection of wires due to the vibration of the pipe. The flow rate measuring apparatus includes a bonding portion (16) corresponding to a deformation suppression portion provided between an inner wall surface (17a) of a flange (17) of a base (11) and an outer circumferential wall surface (6a) of a cover (6) covering a circuit board (5), which is opposed to the inner wall surface (17a), for connecting the flange (17) and the cover (6) to suppress the deformation of a base main body (32) of the base (11) due to vibration of an intake pipe (50).

18 Claims, 13 Drawing Sheets

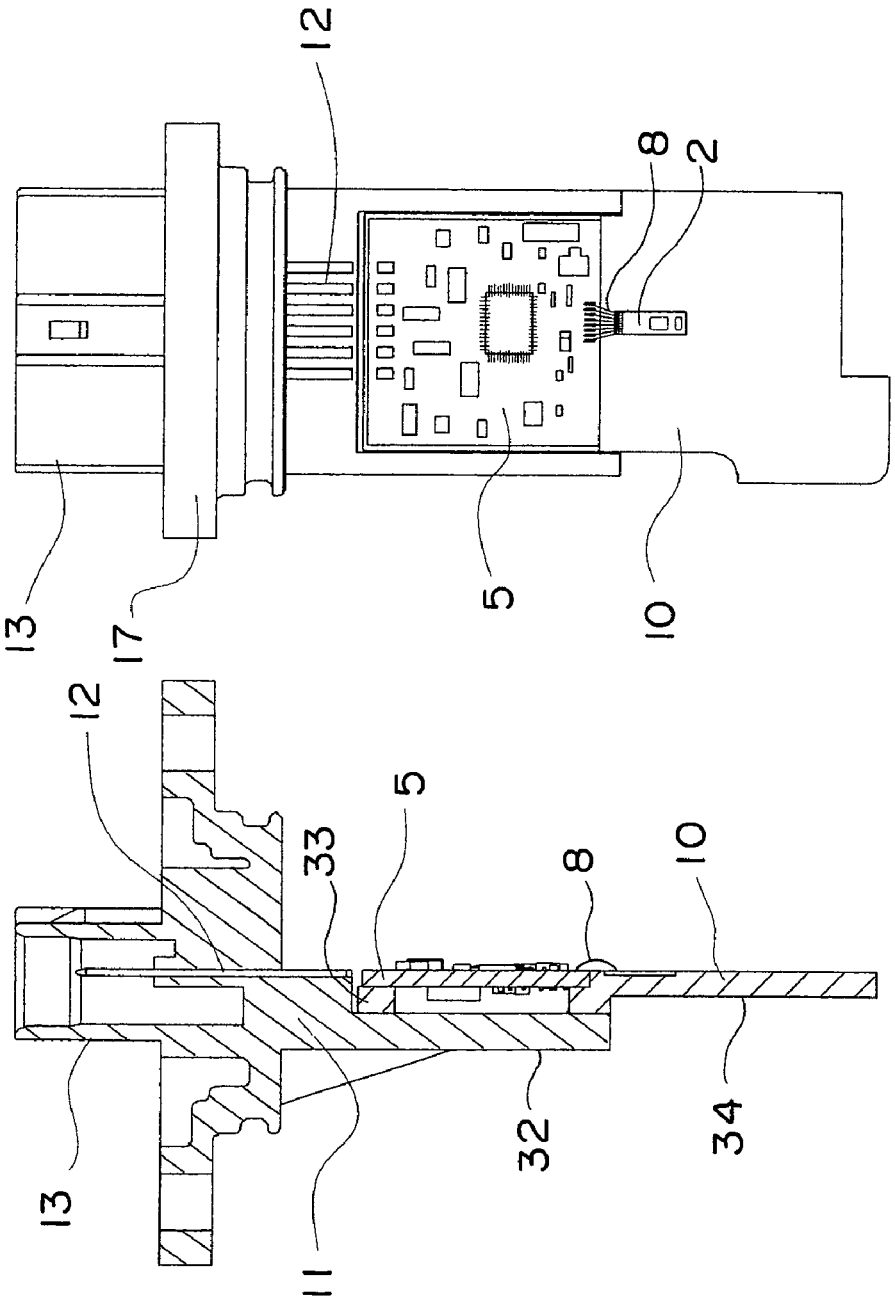

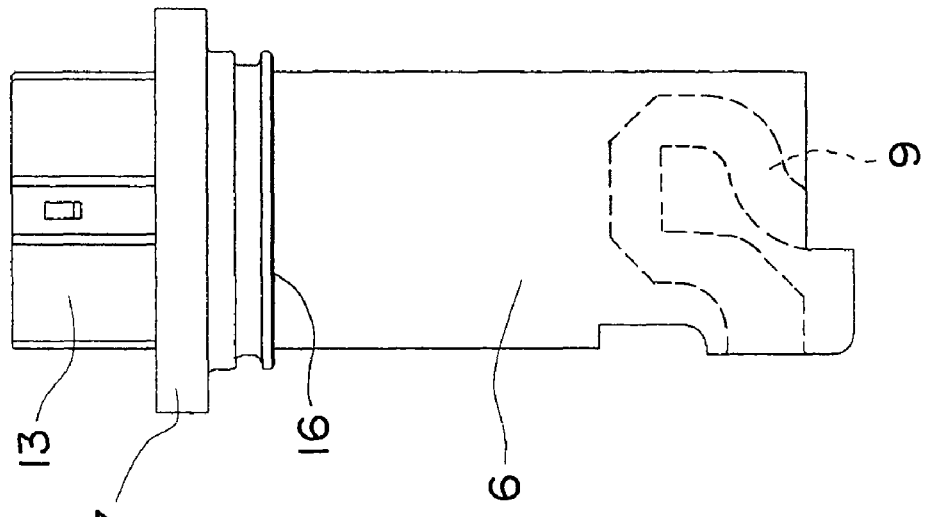
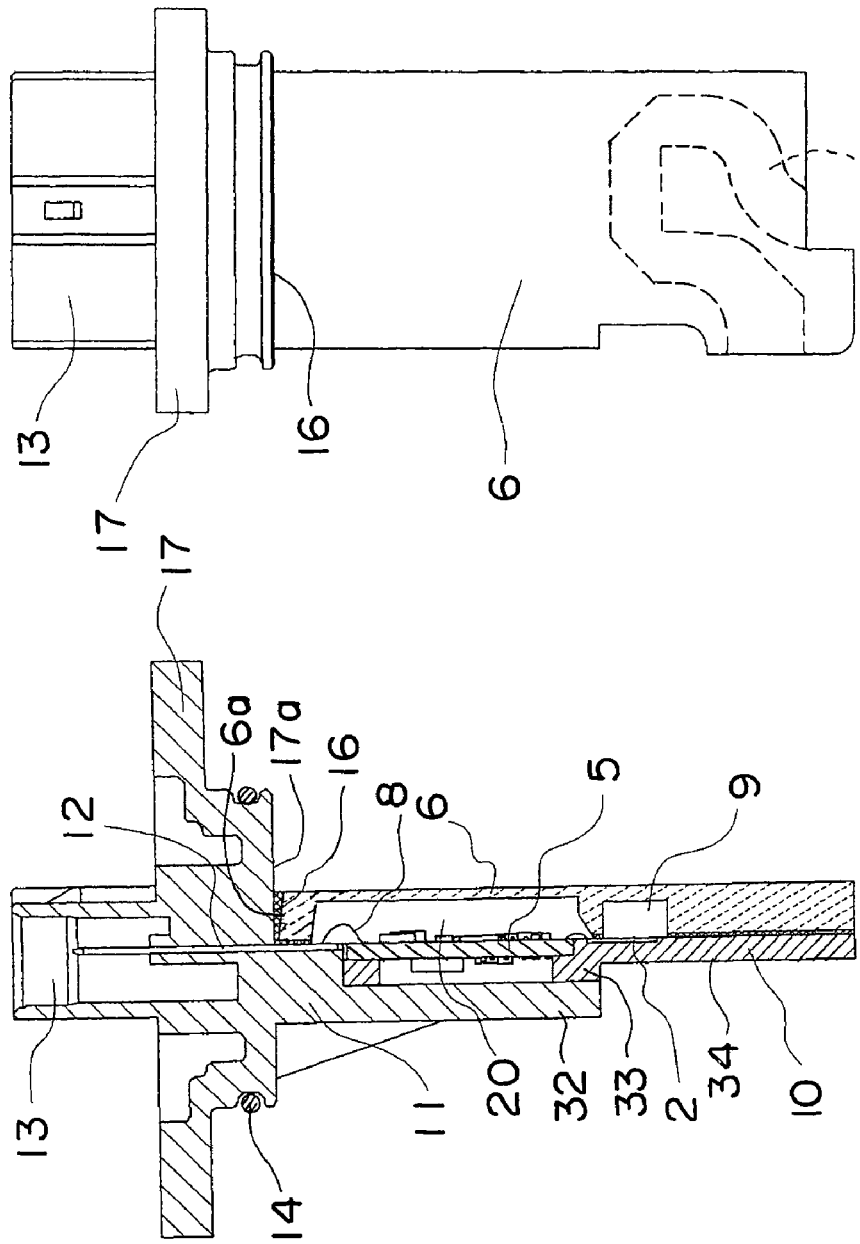
FIG. 7A
FIG. 7B

FLOW RATE MEASURING APPARATUS

BACKGROUND OF THE INVENTION

1. Field of the Invention

The present invention relates to a flow rate measuring apparatus for outputting a signal according to a flow rate, for example, to a flow rate measuring apparatus suitable for measuring an intake air flow rate of an internal combustion engine.

2. Description of the Related Art

Conventionally, the following flow rate measuring apparatus is known. The flow rate measuring apparatus is inserted into an apparatus insertion hole provided to an intake pipe so as to be installed therein to measure a flow rate of air passing through the intake pipe (see Japanese Patent Application Laid-open No. 2009-008619 (FIG. 1)).

The flow rate measuring apparatus includes: a base made of a resin, which includes a base main body having a connector formed at a base end portion so as to project to the outside of the intake pipe, and a flange provided so as to radially extend from the base main body to be fitted into the apparatus insertion hole; a plate provided so as to partially overlap the base main body; a flow rate detection element provided on the plate in an exposed manner, for detecting the air flow rate; a circuit board provided on the plate on a side closer to the connector, which includes a control circuit for processing a signal from the flow rate detection element; a housing made of a resin, including a fluid passage groove which forms a measurement passage in cooperation with the plate, and an enclosure portion for enclosing the circuit board; and a cover which closes the enclosure portion to cover the circuit board.

One surface of the plate is bonded to the base main body of the base by an adhesive, whereas the other surface of the plate is bonded to the flow rate detection element, the circuit board, and the housing by an adhesive.

The enclosure portion of the housing is fitted into a concave portion formed in an inner wall surface of the flange of the base, whereas the housing is bonded to the base main body and the plate (see FIG. 16).

In the flow rate measuring apparatus having the above-mentioned configuration, the enclosure portion of the housing is fitted into the concave portion of the base so that the housing is fixed to the base. When vibration is applied to the intake pipe, a so-called cantilever state occurs. In the cantilever state, the flange of the base becomes a fixed end, whereas a distal end of the combination of the plate and the housing becomes a free end. In a certain vibration frequency range, resonance vibration occurs with the flange acting as a base point. As a result, the free end is horizontally deformed about the base point as a center.

In the case of the flow rate measuring apparatus described above, when the enclosure portion is fitted into the concave portion to fix the housing to the base, a clearance is present between the enclosure portion and the concave portion of the base although the clearance is small. Therefore, a margin for the deformation of the base main body is increased by the amount of the clearance. With the deformation of the base main body, the circuit board is also deformed. Then, a repeated stress is generated on a wire which electrically connects the connector and the circuit board to each other. As a result, there is a problem in that fatigue disconnection of the wire is likely to occur.

SUMMARY OF THE INVENTION

The present invention has been made to solve the problem described above, and has an object to provide a flow rate measuring apparatus capable of reducing occurrence of disconnection of wires due to vibration of a pipe.

Bearing the above object in mind, a flow rate measuring apparatus according to the present invention comprises:

a base made of a resin, including: a base main body including a connector formed at a base end portion of the base main body so as to project to outside of the pipe; and a flange provided so as to radially extend from the base main body to be fitted into the apparatus insertion hole;

a plate provided so as to partially overlap the base main body; a flow rate detection element provided on the plate in an exposed manner, for detecting the flow rate of the fluid to be measured; a circuit board provided on the plate on a side close to the connector, which includes a control circuit for processing a signal from the flow rate detection element;

a cover made of a resin, including: a circuit housing portion covering the circuit board; and a fluid passage groove for forming a measurement passage in cooperation with the plate;

wires provided inside the circuit housing portion, for electrically connecting the connector and the circuit board to each other; and deformation suppression means provided between an inner wall surface of the flange and an outer circumferential wall surface of the cover, the outer circumferential wall surface being opposed to the inner wall surface, for connecting the flange and the cover to each other to suppress deformation of the base main body due to vibration of the pipe.

According to the flow rate measuring apparatus of the present invention, the deformation suppression means for connecting the flange and the cover to each other is provided between the inner wall surface of the flange and the outer circumferential wall surface of the cover, which is opposed to the inner wall surface. Therefore, the deformation of the base main body due to the vibration of the pipe is suppressed. As a result, the effects of reducing the occurrence of disconnection of the wires due to the vibration of the pipe and the like can be obtained.

BRIEF DESCRIPTION OF THE DRAWINGS

FIG. 6A is a side sectional view as the plate illustrated in FIGS. 5A, 5B is connected to the base illustrated in FIG. 1.

FIG. 6B is a front elevational view of FIG. 6a.

FIG. 7A is a side sectional view as the cover is connected to the plate illustrated in FIG. 6A.

FIG. 7B is a front elevational view of FIG. 7A.

DETAILED DESCRIPTION OF THE PREFERRED EMBODIMENTS

Figure 1:
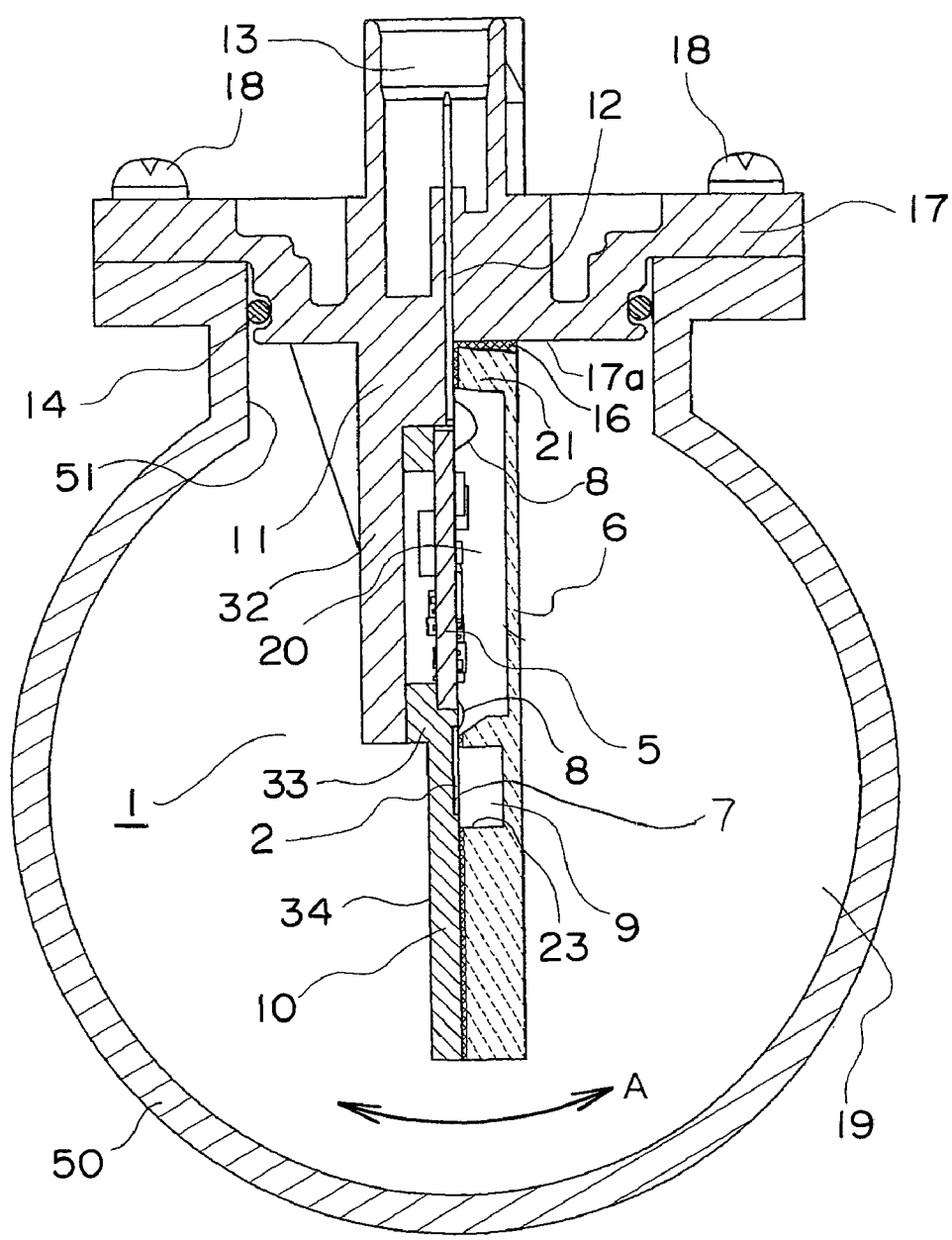
FIG. 1 is a longitudinal sectional view of a flow rate measuring apparatus according to Embodiment 1 of the present invention as viewed from an upstream side.

Hereinafter, each of embodiments of the present invention is described based on the accompanying drawings. In each of the drawings, the same or equivalent members and parts are denoted by the same reference numerals for the description.

Embodiment 1

Figure 2:
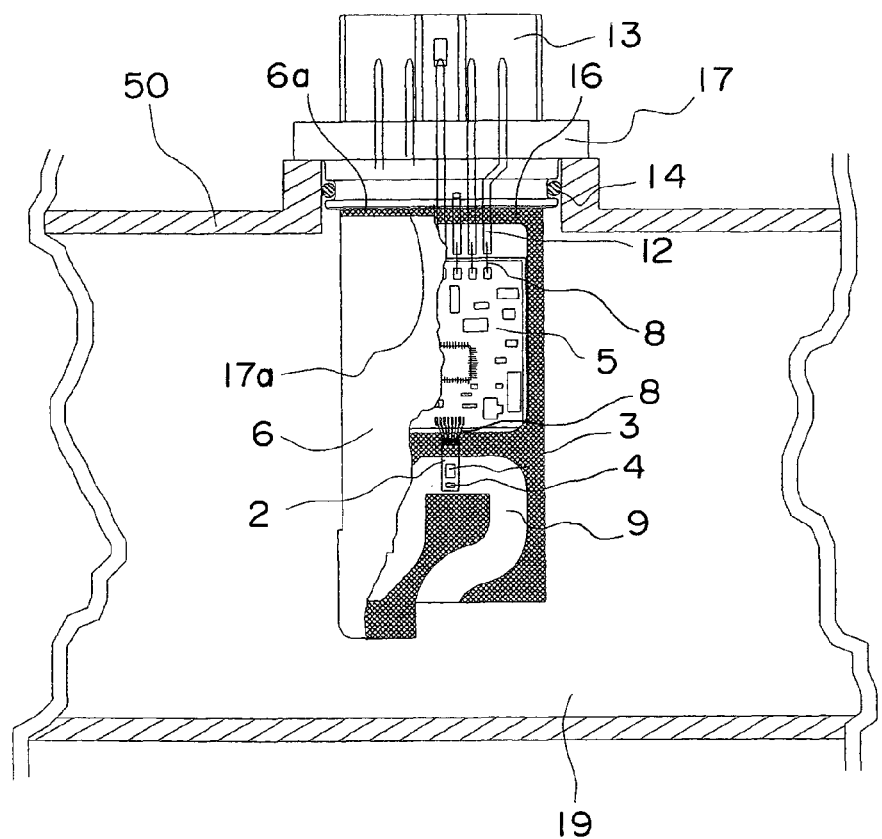
FIG. 2 is a partially cutaway front view of the flow rate measuring apparatus illustrated in FIG. 1.
Figure 3:
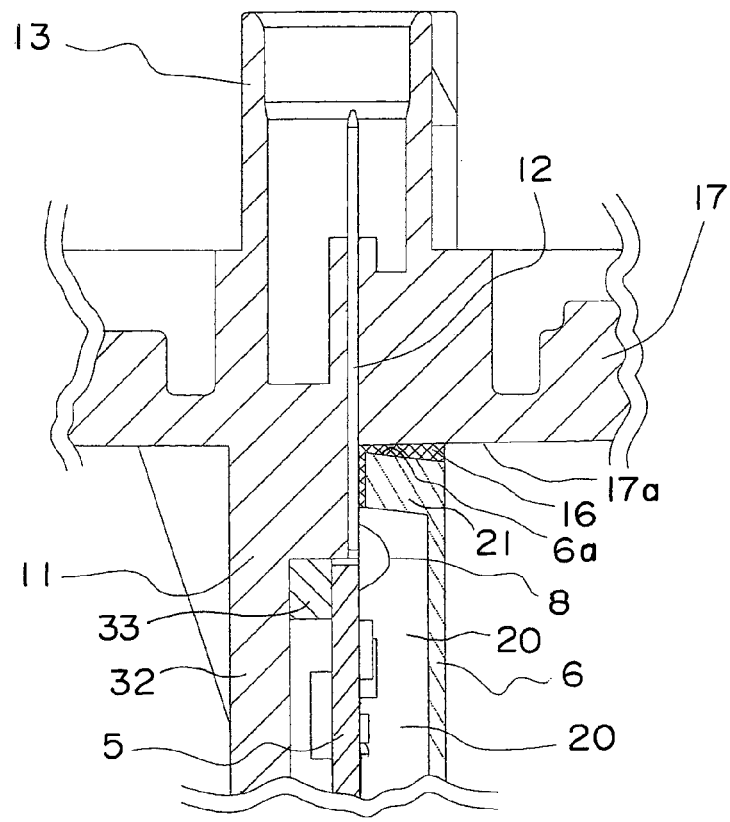
FIG. 3 is an enlarged view of a principal part of the flow rate measuring apparatus illustrated in FIG. 1.

FIG. 1 is a longitudinal sectional view of a flow rate measuring apparatus 1 according to Embodiment 1 of the present invention as viewed from an upstream side, FIG. 2 is a partially cutaway front view of the flow rate measuring apparatus 1 illustrated in FIG. 1, and FIG. 3 is an enlarged view of a principal part of the flow rate measuring apparatus 1 illustrated in FIG. 1.

An apparatus insertion hole 51 is provided to an intake pipe 50 of an internal combustion engine. The flow rate measuring apparatus 1 is inserted into the apparatus insertion hole 51 so as to be installed inside the intake pipe 50 having a cylindrical shape.

The flow rate measuring apparatus 1 includes a base 11, a plate 10, a flow rate detection element 2, a circuit board 5, and a cover 6. The plate 10 is connected to the base 11 on a surface along a flow direction of air corresponding to a fluid to be measured. The flow rate detection element 2 is provided on the plate 10 in an exposed manner and detects a flow rate of the air. The circuit board 5 is provided on a surface of the plate 10, on which the flow rate detection element 2 is provided, and includes a control circuit for processing a signal from the flow rate detection element 2. The cover 6 is bonded to the plate 10 and the base 11.

The base 11 includes a base main body 32 and a flange 17. The base main body 32 has a distal end portion which radially extends inside a main passage 19 corresponding to a pipe passage. At a base end portion of the base main body 32, a connector 13 projecting to the outside of the intake pipe 50 is provided. The flange 17 is provided so as to radially extend from the base main body 32 and is fitted into the apparatus insertion hole 51.

Terminals 12 are integrally formed with the base 11 by molding. Each of the terminals 12 has one end portion constituting a terminal of the connector 13 and the other end portion which is electrically connected to the circuit board 5 through an intermediation of wires 8.

The flow rate measuring apparatus 1 is fixed to the intake pipe 50 by mounting screws 18 provided at four corners of the flange 17. An O-ring 14 for preventing air from leaking through a clearance between the apparatus insertion hole 51 and the flange 17 is provided in a groove portion formed in a circumferential side surface of the flange 17 so as to be held in close contact therewith.

The plate 10 is formed of, for example, a polybutylene terphthalate (PBT) resin. The plate 10 has a frame portion 33 having a window-like shape, on which the circuit board 5 is placed. A flat plate portion 34 is connected to the frame portion 33 through an intermediation of a level-difference portion. A concave portion 7 which houses the flow rate detection element 2 therein is formed on the flat plate portion 34 on the side closer to the frame portion 33. The flow rate detection element 2 is electrically connected to the circuit board 5 through the wires 8.

The cover 6 is integrally formed of a resin. The cover 6 has a circuit housing portion 20 which covers and houses the circuit board 5 therein and a fluid passage groove 23. In corporation with the plate 10, the fluid passage groove 23 forms a measurement passage 9 for guiding air, in which the flow rate detection element 2 is provided.

A thermosetting silicone adhesive is applied to areas of the cover 6, which are illustrated as meshed areas in FIG. 2, to bond the cover 6 to the plate 10 and the base 11. A bonding portion 16 formed by curing the adhesive is formed between an inner wall surface 17a of the flange 17 and an outer circumferential wall surface 6a of the cover 6, which is opposed to the inner wall surface 17a.

The bonding portion 16 constitutes deformation suppression means for suppressing deformation of the base main body 32 due to vibration of the intake pipe 50 by firmly connecting and fixing the flange 17 and the cover 6 to each other.

The flow rate detection element 2 includes a flow rate detection resistor 3 and a temperature compensation resistor 4. In cooperation with the plate 10, a surface of the flow rate detection element 2 forms a part of a wall surface of the measurement passage 9.

The flow rate detection resistor 3 and the temperature compensation resistor 4 are formed in combination on an insulating substrate. However, heat-insulating means (not shown) is provided so that heat of the flow rate detection resistor 3 is hardly conducted to the temperature compensation resistor 4.

Next, a procedure of fabrication of the flow rate measuring apparatus 1 having the configuration described above is described based on FIGS. 4A to 7B.

Figure 4A:
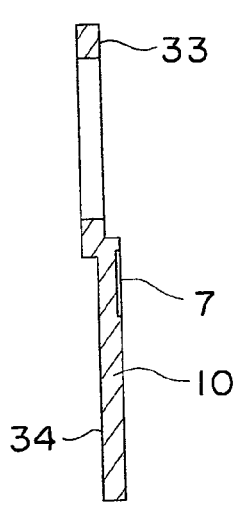
FIG. 4A is a side sectional view of the plate illustrated in FIG. 1.
Figure 4B:
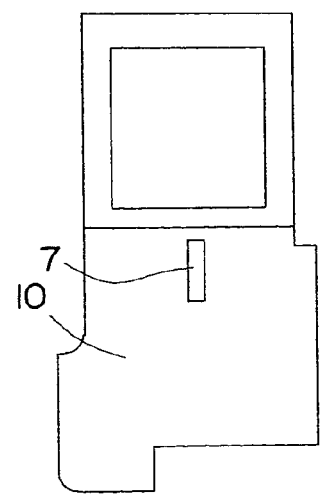
FIG. 4B is a front elevational view of FIG. 4A.
Figure 5A:
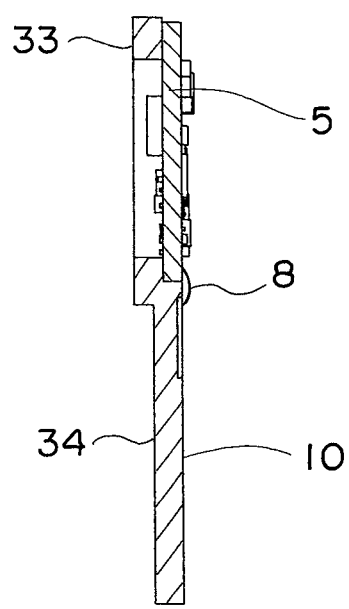
FIG. 5A is a side sectional view as the circuit board and the flow rate detection element are electrically connected to the plate illustrated in FIG. 1.
Figure 5B:
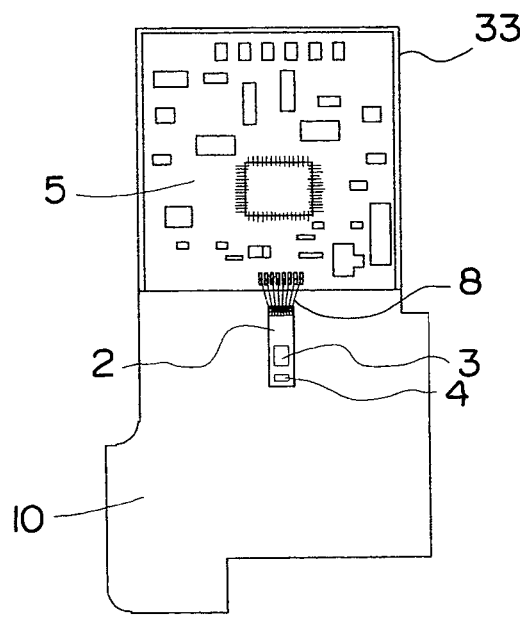
FIG. 5B is a front elevational view of FIG. 5A.

First, on the plate 10 illustrated in FIGS. 4A and 4B, the silicone adhesive is applied to the concave portion 7. Then, the circuit board 5 and the flow rate detection element 2 are placed on the plate 10. Further, the circuit board 5 and the flow rate detection element 2 are electrically connected by wire bonding using the wires 8 (FIGS. 5A and 5B).

In this state, circuit adjustment for matching between the circuit board 5 and the flow rate detection element 2 is performed.

Next, the adhesive is applied to the frame portion 33 of the plate 10 so as to bond the plate 10 to the base main body 32 (FIGS. 6A and 6B).

Further, the circuit board 5 and the terminals 12 are electrically connected to each other by wire bonding using the wires 8. After a sealing gel (not shown) is injected, the cover 6 is bonded to the base 11 and the plate 10 by using the adhesive. Thereafter, the sealing gel and the adhesive are thermally cured (FIGS. 7A and 7B).

Although the thermosetting adhesive is used in this embodiment, a room-temperature setting adhesive may also be used instead.

Moreover, in this embodiment, the bonding portion 16 is formed between the inner wall surface 17a of the flange 17 and the outer circumferential wall surface 6a of the cover 6 and constitutes the deformation suppression means. However, the inner wall surface 17a of the flange 17 and the outer circumferential wall surface 6a of the cover 6 may be welded to form a welded portion so as to connect the flange 17 and the cover 6 to each other. Then, the welded portion may be used as the deformation suppression means for suppressing the deformation of the base main body 32 due to the vibration of the intake pipe 50.

Next, the effects of the flow rate measuring device 1 according to Embodiment 1 are described in comparison with a flow rate measuring apparatus 1A described in Japanese Patent Application Laid-open No. 2009-008619 cited above.

Figure 16:
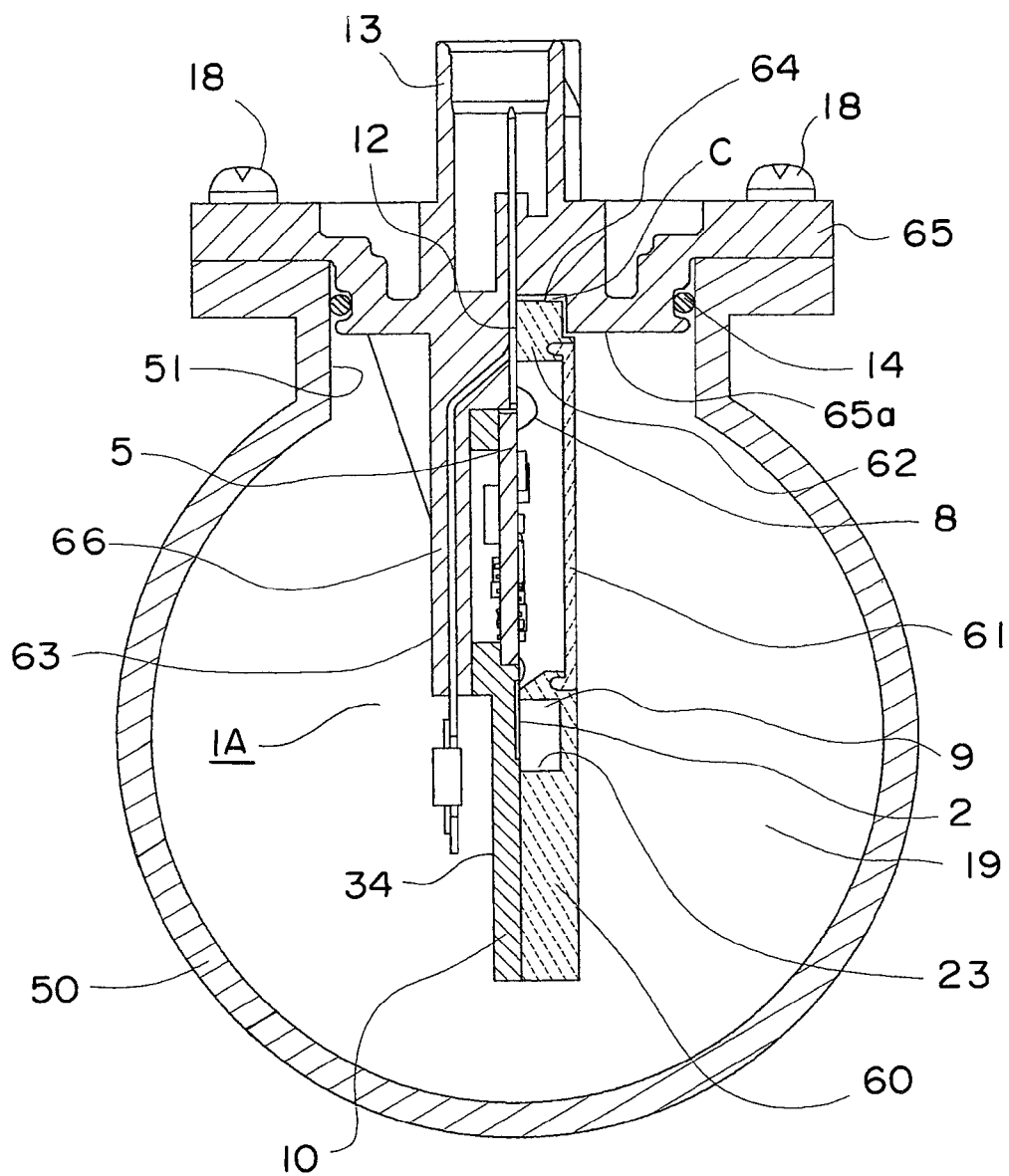
FIG. 16 is a longitudinal sectional view of a prior flow rate measuring apparatus as viewed from an upstream side.

FIG. 16 is a longitudinal sectional view of the flow rate measuring apparatus 1A as viewed from an upstream side.

In the flow rate measuring apparatus 1A, a housing 60 including the fluid passage groove 23 and a cover 61 correspond to the cover 6 of the flow rate measuring apparatus 1 of Embodiment 1. The cover 61 is provided on an enclosure portion 62 of the housing 60, which surrounds the circuit board 5.

One surface of the plate 10 is bonded to a base main body 66 of a base 63 by a thermosetting adhesive, whereas the other surface of the plate 10 is bonded to the flow rate detection element 2, the circuit board 5, and the housing 60 by a thermosetting adhesive. The enclosure portion 62 of the housing 60 is fitted into a concave portion 64 formed in an inner wall surface 65a of a flange 65 of the base 63 and is also bonded to the base main body 63 and the plate 10.

Each of the base 63 and the housing 60 is formed of a resin by molding. The molding includes a step of performing drawing from a die. Therefore, a slight taper is generated on each of surfaces of the concave portion 64 of the base 63 and the enclosure portion 62 of the housing 60.

Thus, when the enclosure portion 62 is fitted into the concave portion 64 to fix the housing 60 to the base 63, a clearance C is present between the enclosure portion 62 and the concave portion 64 of the base 63 although the clearance is small.

In the case of the flow rate measuring apparatus 1A having the above-mentioned configuration, when vibration is applied to the intake pipe 50, a so-called cantilever state occurs. In the cantilever state, the flange 65 becomes a fixed end, whereas a distal end of the combination of the plate 10 and the housing 60 becomes a free end. Therefore, in a certain vibration frequency range, resonance vibration occurs with the flange 65 acting as a base point. As a result, the free end is horizontally deformed about the base point as a center.

In this case, the clearance C is present between the enclosure portion 62 and the concave portion 64 of the base 63. Therefore, a margin for the deformation of the base main body 66 is increased at least by the amount of the clearance C.

Moreover, a bending moment is applied. The bending moment is obtained by multiplying a force expressed by a product of a mass of the plate 10, the circuit board 5, the housing 60, and the cover 61, which are placed on the base main body 66 of the base 63, and a vibration acceleration, by a distance from the flange 65 to a distal end of the housing 60, which is on the side opposite to the connector 13. Thus, the deformation of the base main body 66 is further increased.

The circuit board 5 is placed on the base main body 66 through an intermediation of the plate 10. Therefore, the circuit board 5 is also repeatedly deformed by the deformation of the base main body 66.

Thus, with the deformation of the circuit board 5, a repeated stress is generated on the wires 8 which electrically connect the terminals 12 and the circuit board 5 to each other while a connected portion of each of the wires 8 on the side closer to the terminals 12 acts as a fixed end and a connected portion of each of the wires 8 on the side closer to the circuit board 5 acts as a free end. As a result, there is a fear in that fatigue disconnection of the wires 8 occurs.

Further, in the flow rate measuring apparatus 1A having the configuration described above, the plate 10, the circuit board 5, and the housing 60 are placed on the base 63 so as to be oriented in the same direction for assembly. In the middle of the assembly, however, in order to fit the enclosure portion 62 of the housing 60 into the concave portion 64, the housing 60 is required to be brought to be fitted in a direction perpendicular to the direction in which the plate 10 and the circuit board 5 are placed for the assembly. Accordingly, the placement and the assembly cannot be performed only unidirectionally. As a result, it is difficult to mechanize a fabrication process, which prevents a reduction in cost.

On the other hand, even in the case of the flow rate measuring apparatus 1 according to Embodiment 1, when the vibration is applied to the intake pipe 50, the so-called cantilever state occurs. In the cantilever state, the flange 17 becomes a fixed end, whereas a distal end of the combination of the plate 10 and the cover 6 becomes a free end. In a certain vibration frequency range, the resonance vibration occurs with the flange 17 acting as a base point. As a result, the free end is horizontally deformed about the base point as a center as indicated by an arrow A (FIG. 1).

In the flow rate measuring apparatus 1 of Embodiment 1, however, the outer circumferential wall surface 6a of the cover 6 and the inner wall surface 17a of the flange 17 are firmly connected and fixed to each other by the bonding portion 16 corresponding to the deformation suppression means. Therefore, even if the resonance vibration occurs in the plate 10 and the cover 6, stiffness is ensured at the fixed end. The amount of displacement of the base main body 32, the plate 10, and the cover 6 as a whole is suppressed.

Thus, for the circuit board 5 provided on the base 11 through an intermediation of the plate 10, the amount of displacement of the base main body 32 is minimized. Thus, the amount of deformation of the wires 8 which electrically connect the terminals 12 and the circuit board 5 to each other is suppressed to reduce the repeated stress generated on the wires 8. As a result, the occurrence of the fatigue disconnection of the wires 8 due to the repeated stress is remarkably reduced.

Further, in the flow rate measuring apparatus 1 having the above-mentioned configuration, the bonding portion 16 which connects the flange 17 and the cover 6 to each other is present on the inner wall surface 17a of the flange 17. Therefore, the plate 10, the circuit board 5, and the cover 6 can be placed on the base main body 32 so as to be oriented in the same direction for the assembly. Thus, the mechanization of the fabrication process is facilitated to allow a reduction in cost.

Embodiment 2

Figure 8:
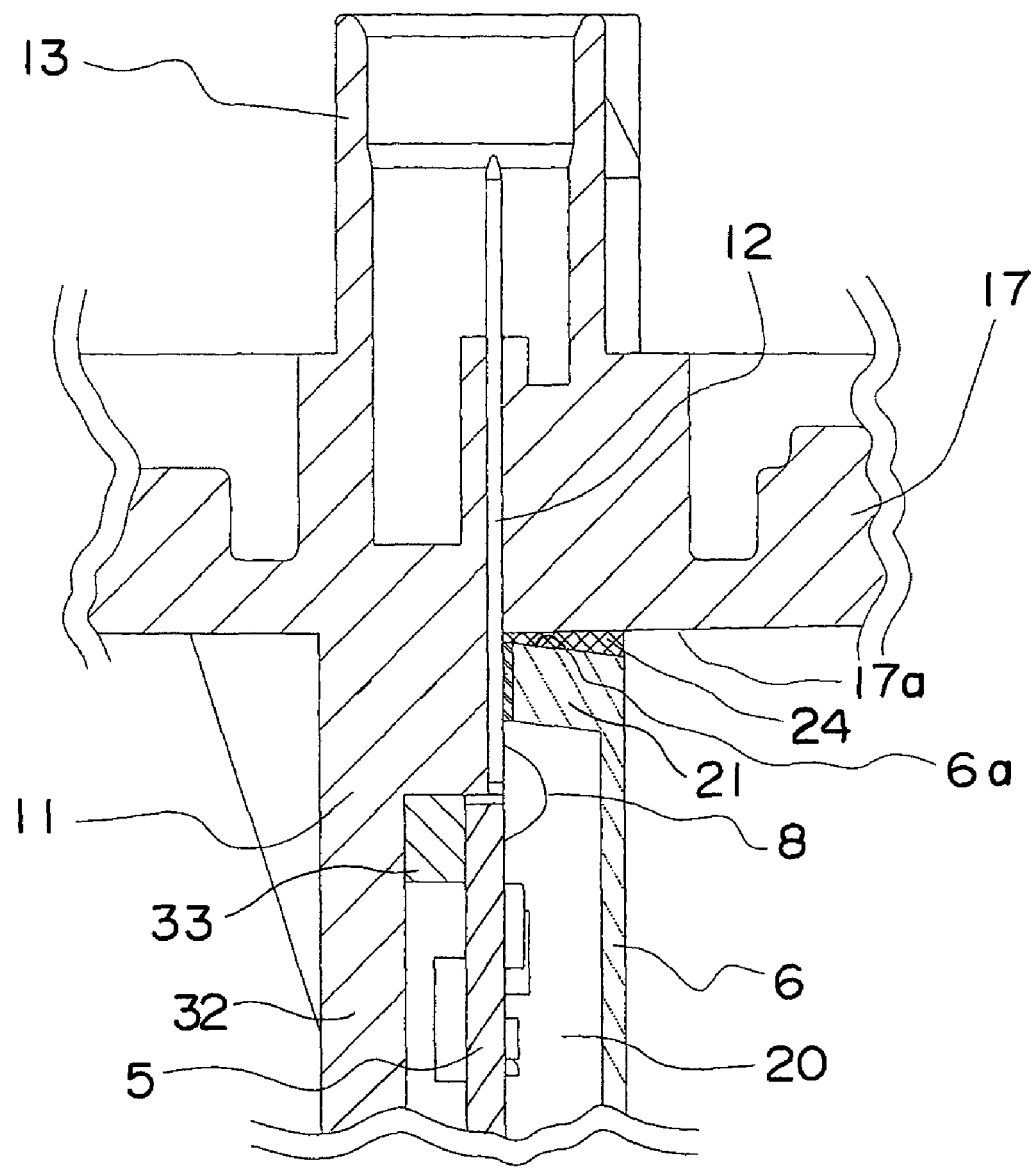
FIG. 8 is an enlarged sectional view of a principal part of the flow rate measuring apparatus according to Embodiment 2 of the present invention.

FIG. 8 is an enlarged sectional view of a principal part of the flow rate measuring apparatus 1 according to Embodiment 2 of the present invention.

In Embodiment 2, the cover 6 is bonded to the base main body 32 by the thermosetting silicone adhesive, whereas the cover 6 is bonded to the inner wall surface 17a of the flange 17 by an epoxy adhesive having higher stiffness than that of the silicone adhesive after being cured.

The remaining configuration is the same as that of Embodiment 1.

In the flow rate measuring apparatus 1 having the above-mentioned configuration, the flange 17 and the cover 6 are connected by a bonding portion 24 corresponding to the deformation suppression means, which is formed of the cured epoxy adhesive having higher stiffness than that of the bonding portion 16 of Embodiment 1. Therefore, the base 11 and the cover 6 are more firmly connected to each other.

Thus, the amount of displacement of the base main body 32, the plate 10, and the cover 6 as a whole is reduced as compared with that of Embodiment 1. Accordingly, the occurrence of the fatigue disconnection of the wires 8 is more remarkably reduced.

Moreover, the cover 6 is bonded to the base main body 32 and the plate 10 by the silicone adhesive having lower stiffness than that of the epoxy adhesive. Therefore, a stress generated between the members due to the deformation of the base main body 32, the plate 10, and the cover 6 is reduced as compared with the case where the epoxy adhesive is used.

In the fabrication process of the flow rate measuring apparatus 1 according to Embodiment 2, it is desirable that the epoxy adhesive and the silicone adhesive be thermally cured at the same time in view of fabrication efficiency.

In the case where a curing agent contained in the epoxy adhesive is an amine curing agent containing an amine material, the silicone adhesive is not sufficiently cured in some cases when the amine curing agent comes into contact with the silicone adhesive.

The above-mentioned phenomenon occurs because the amine curing agent is more strongly coordinated to a platinum catalyst contained in the silicone adhesive than a vinyl group, which prevents the silicone adhesive from being cured.

Thus, in Embodiment 2, as the curing agent of the epoxy adhesive, a non-amine curing agent is used.

Further, it is desirable to use, for example, a latent curing agent, which is a non-amine curing agent and acts as a curing agent by heating, as the curing agent of the epoxy adhesive.

When the epoxy adhesive is applied and cured after the silicone adhesive is thermally cured, there is no fear of insufficient curing of the silicone adhesive. Therefore, in this case, the curing agent contained in the epoxy adhesive may be a curing agent containing the amine material.

Embodiment 3

Figure 9:
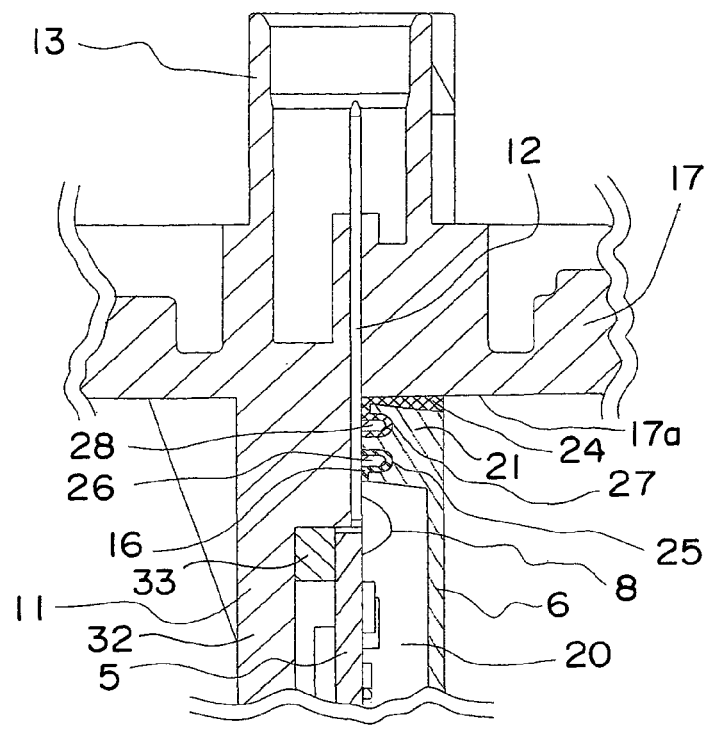
FIG. 9 is an enlarged sectional view of a principal part of the flow rate measuring apparatus according to Embodiment 3 of the present invention.
Figure 10:
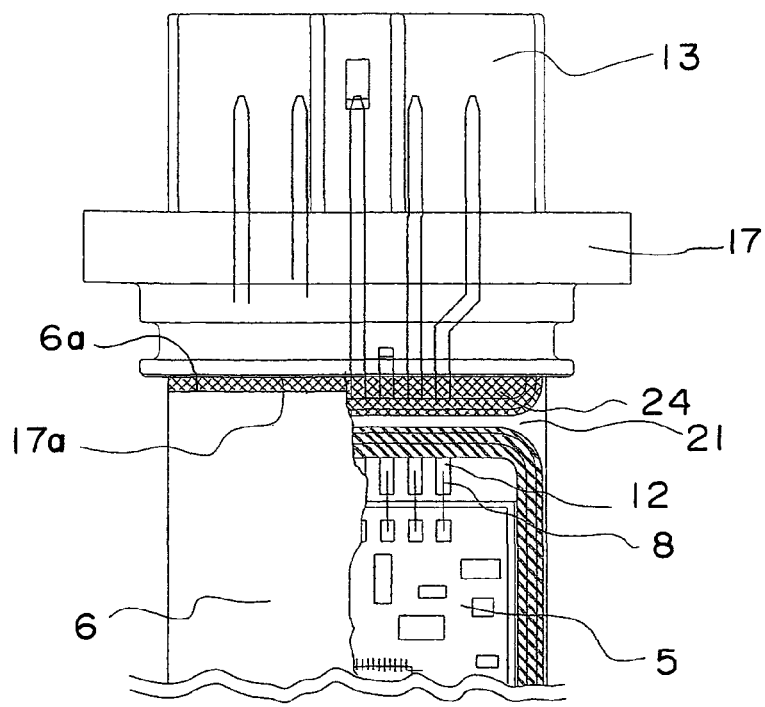
FIG. 10 is a partially cutaway front view of the flow rate measuring apparatus illustrated in FIG. 9.

FIG. 9 is an enlarged sectional view of a principal part of the flow rate measuring apparatus 1 according to Embodiment 3 of the present invention, and FIG. 10 is a partially cutaway front view of the flow rate measuring apparatus 1 illustrated in FIG. 9.

In Embodiment 3, a groove 27, which is to be filled with the epoxy adhesive, is formed in the cover 6 on the side closer to the flange 17 so as to extend in parallel to the inner wall surface 17a of the flange 17. A bonding rib 28, which is loosely inserted into the groove 27, is formed on the base main body 32.

A groove 25, which is to be filled with the silicone adhesive, is formed in the cover 6 on the side closer to the circuit board 5. The groove 25 is formed over an entire circumference along the enclosure portion 21 of the cover 6. A bonding rib 26, which is loosely inserted into the groove 25, is formed on a circumferential edge portion of the base main body 32, which surrounds the circuit board 5.

Further, a space between the outer circumferential wall surface 6a of the cover 6 and the inner wall surface 17a of the flange 17 is also filled with the epoxy adhesive. The adhesive is cured to form the bonding portion 24.

The remaining configuration is the same as the flow rate measuring apparatus 1 of Embodiment 1.

In the flow rate measuring apparatus 1 of Embodiment 3, the bonding portion 24 corresponding to the deformation suppression means is reinforced by the bonding rib 28 which is loosely inserted into the groove 27 filled with the epoxy adhesive. Therefore, in comparison with Embodiment 2, the amount of displacement of the base main body 32, the plate 10, and the cover 6 is further reduced to further remarkably reduce the occurrence of the fatigue disconnection of the wires 8.

Moreover, the portions filled with and bonded by the epoxy adhesive and the portions filled with and bonded by the silicone adhesive, which is not an epoxy adhesive, are separated from each other. Therefore, the epoxy adhesive and the thermosetting silicone adhesive do not come into contact with each other.

Thus, even when the epoxy adhesive and the silicone adhesive are thermally cured at the same time in the fabrication process of the flow rate measuring apparatus 1, the insufficient curing of the silicone adhesive does not occur. As a result, the flow rate measuring apparatus 1 can be efficiently fabricated to reduce the fabrication cost.

Embodiment 4

Figure 11:
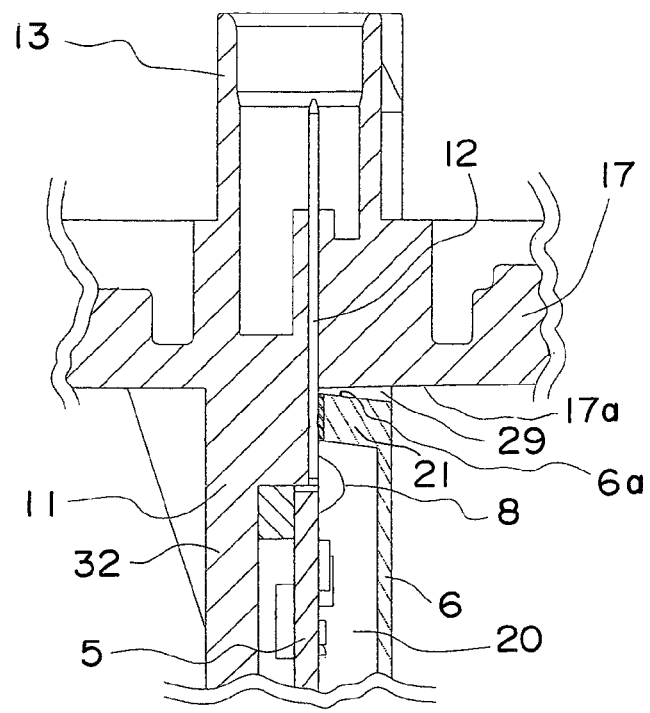
FIG. 11 is an enlarged sectional view of a principal part of the flow rate measuring apparatus according to Embodiment 4 of the present invention.
Figure 12:
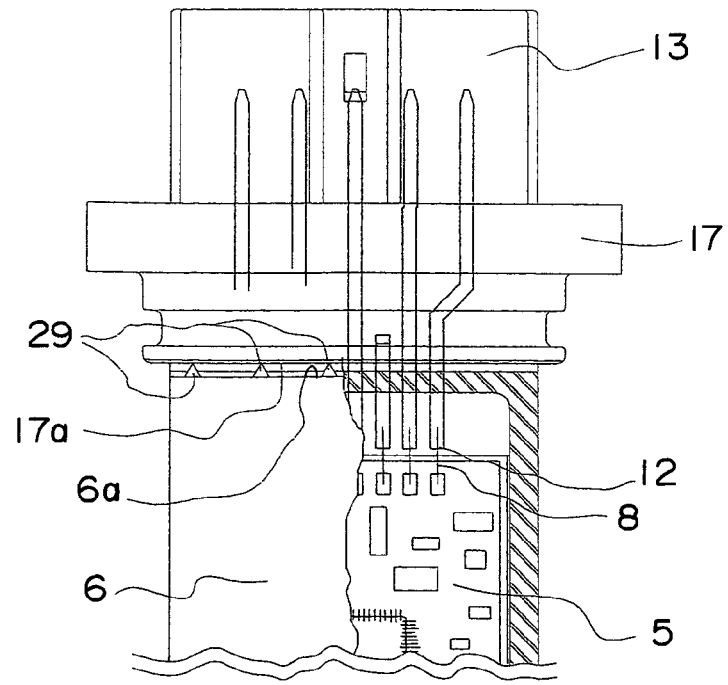
FIG. 12 is a partially cutaway front view of the flow rate measuring apparatus illustrated in FIG. 11.

FIG. 11 is an enlarged sectional view of a principal part of the flow rate measuring apparatus 1 according to Embodiment 4 of the present invention, and FIG. 12 is a partially cutaway front view of the flow rate measuring apparatus 1 illustrated in FIG. 11.

In Embodiment 4, projecting portions 29, each having a triangle pole-like shape and extending toward the base main body 32, are formed on the outer circumferential wall surface 6a of the cover 6 over an entire width at intervals.

The cover 6 is bonded and fixed to the base main body 32 by the adhesive to cover the circuit board 5.

When the cover 6 is fixed to the base main body 32 by the adhesive, the projecting portions 29 corresponding to the deformation suppression means are pressed by the inner wall surface 17a of the flange 17 to be plastically deformed. As a result, the projecting portions 29 are brought into pressure-contact with the inner wall surface 17a of the flange 17.

The remaining configuration is the same as the flow rate measuring apparatus 1 of Embodiment 1.

In the flow rate measuring apparatus 1 of Embodiment 4, the projecting portions 29, which are brought into pressure-contact with the inner wall surface 17a of the flange 17, have the same functions as those of the bonding portion 16 corresponding to the deformation suppression means of Embodiment 1, which firmly connects the flange 17 and the cover 6 to each other.

Thus, when the vibration is applied to the intake pipe 50, the same effects as those of the flow rate measuring apparatus 1 of Embodiment 1 can be obtained even without using the adhesive. In addition, the step of applying and curing the adhesive to form the bonding portion 16, which is required in Embodiment 1, is no longer required. Accordingly, in comparison with Embodiment 1, the higher effects of reducing the cost can be obtained.

Note that, the shape of each of the projecting portions 29 is not limited to the triangle pole-like shape, but may also be other shapes such as, for example, a semicircular column-like shape.

The projecting portions 29 may be formed on the inner wall surface 17a of the flange 17, and may also be formed on the outer circumferential wall surface 6a of the cover 6 in addition to the projecting portions formed on the inner wall surface 17a.

Embodiment 5

Figure 13:
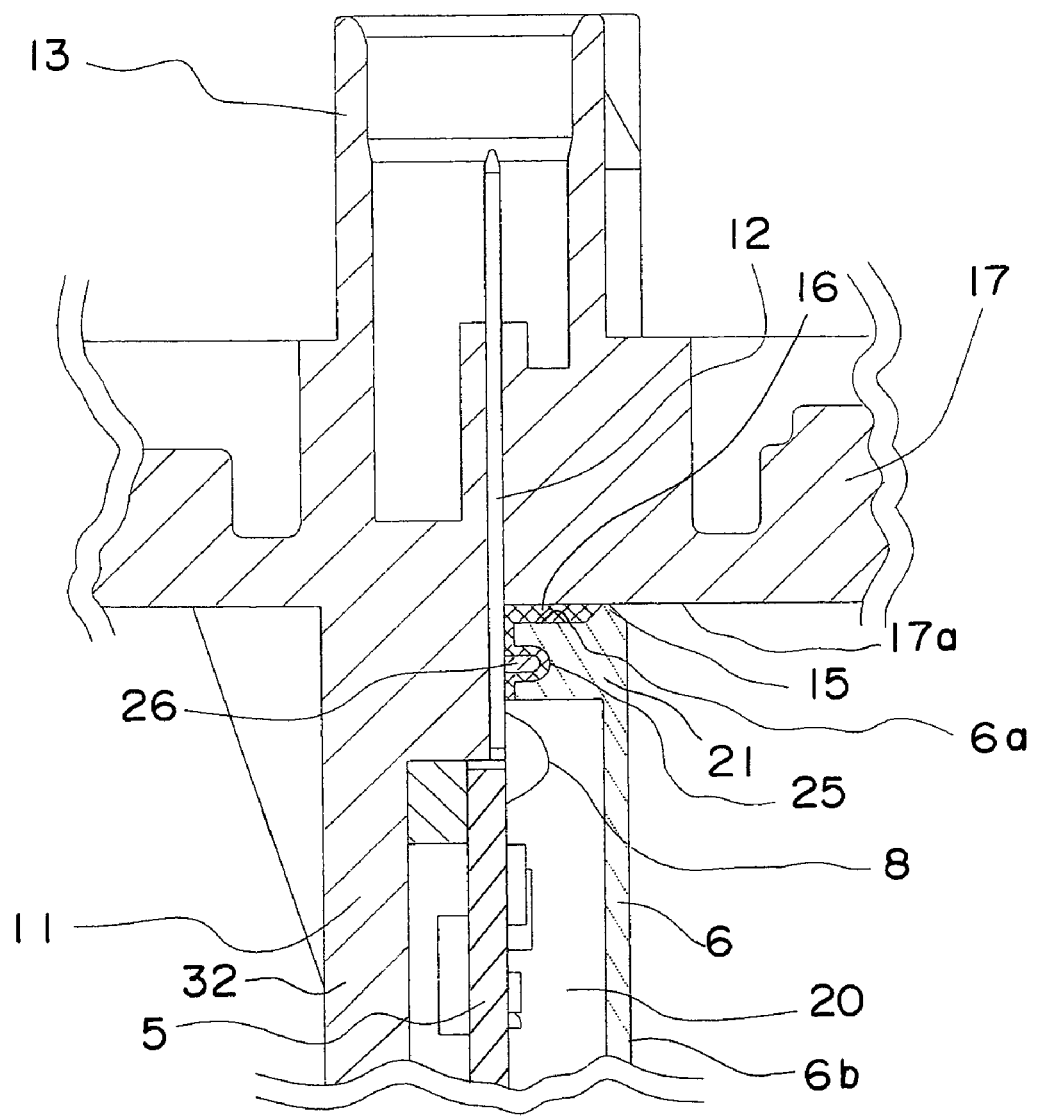
FIG. 13 is a longitudinal sectional view of a flow rate measuring apparatus according to Embodiment 5 of the present invention as viewed from an upstream side.

FIG. 13 is an enlarged sectional view of a principal part of the flow rate measuring apparatus 1 according to Embodiment 5 of the present invention.

In this embodiment, the groove 25, which is to be filled with the silicone adhesive, is formed in the cover 6. The groove 25 is formed over the entire circumference along the enclosure portion 21 of the cover 6. The bonding rib 26, which is loosely inserted into the groove 25, is formed on the circumferential edge portion of the base main body 32, which surrounds the circuit board 5.

The cover 6 is bonded and fixed to the base main body 32 by the silicone adhesive to cover the circuit board 5. Moreover, the bonding portion 16 corresponding to the deformation suppression means is provided to the cover 6 between the inner wall surface 17a of the flange 17 and the outer circumferential wall surface 6a of the cover 6. The bonding portion 16 is formed by curing the silicone adhesive.

A projecting portion 15 having a triangular cross section is formed on the outer circumferential wall surface 6a of the cover 6. The projecting portion 15 has a distal end portion which is brought into pressure-contact with the inner wall surface 17a of the flange 17. The projecting portion 15 corresponding to leakage preventing means prevents the silicone adhesive in an uncured state from leaking to outside.

The remaining configuration is the same as the flow rate measuring apparatus 1 of Embodiment 1.

When the cover 6 is bonded to the base 11 by using the thermosetting silicone adhesive as an adhesive and then the silicone adhesive is thermally cured in the fabrication process of the flow rate measuring apparatus 1, viscosity of the silicone adhesive is sometimes lowered to leak out on a surface 6b of the cover 6 to reduce the commercial value of the product.

In the flow rate measuring apparatus 1 of Embodiment 5, the projecting portion 15 is provided to the cover 6. Therefore, the silicone adhesive does not leak out on the surface 6b of the cover 6. Accordingly, the effects obtained in Embodiment 1 can be obtained, while the commercial value of the product can be prevented from being reduced by dirt due to the leakage of the silicone adhesive.

Moreover, by bringing the projecting portion 15 into pressure-contact with the inner wall surface 17a of the flange 17, the flange 17 and the cover 6 can be more firmly connected to each other in cooperation with bonding at the bonding portion 16.

Note that, the projecting portion 15 may alternatively be formed on the inner wall surface 17a of the flange 17.

Figure 14:
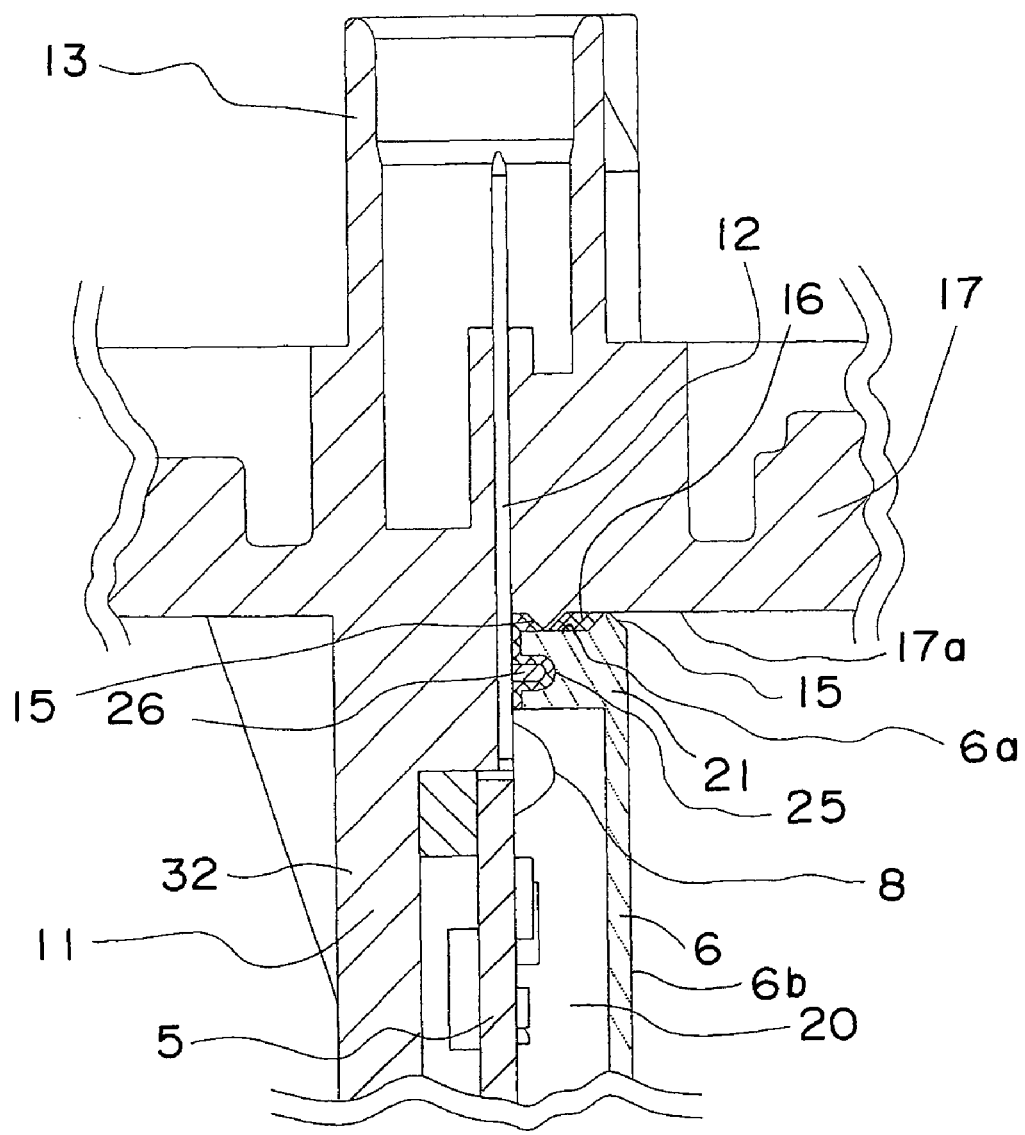
FIG. 14 is an enlarged sectional view of a principal part of the other example of the flow rate measuring apparatus according to Embodiment 5 of the present invention.

Moreover, as illustrated in FIG. 14, the projecting portions 15 may be formed respectively on the outer circumferential wall surface 6a of the cover 6 and the inner wall surface 17a of the flange 17 to form a labyrinth structure.

Further, it is apparent that the epoxy adhesive may be used as the adhesive in place of the thermosetting silicone adhesive. In this case, the flange 17 and the cover 6 can be more firmly connected to each other.

Embodiment 6

Figure 15:
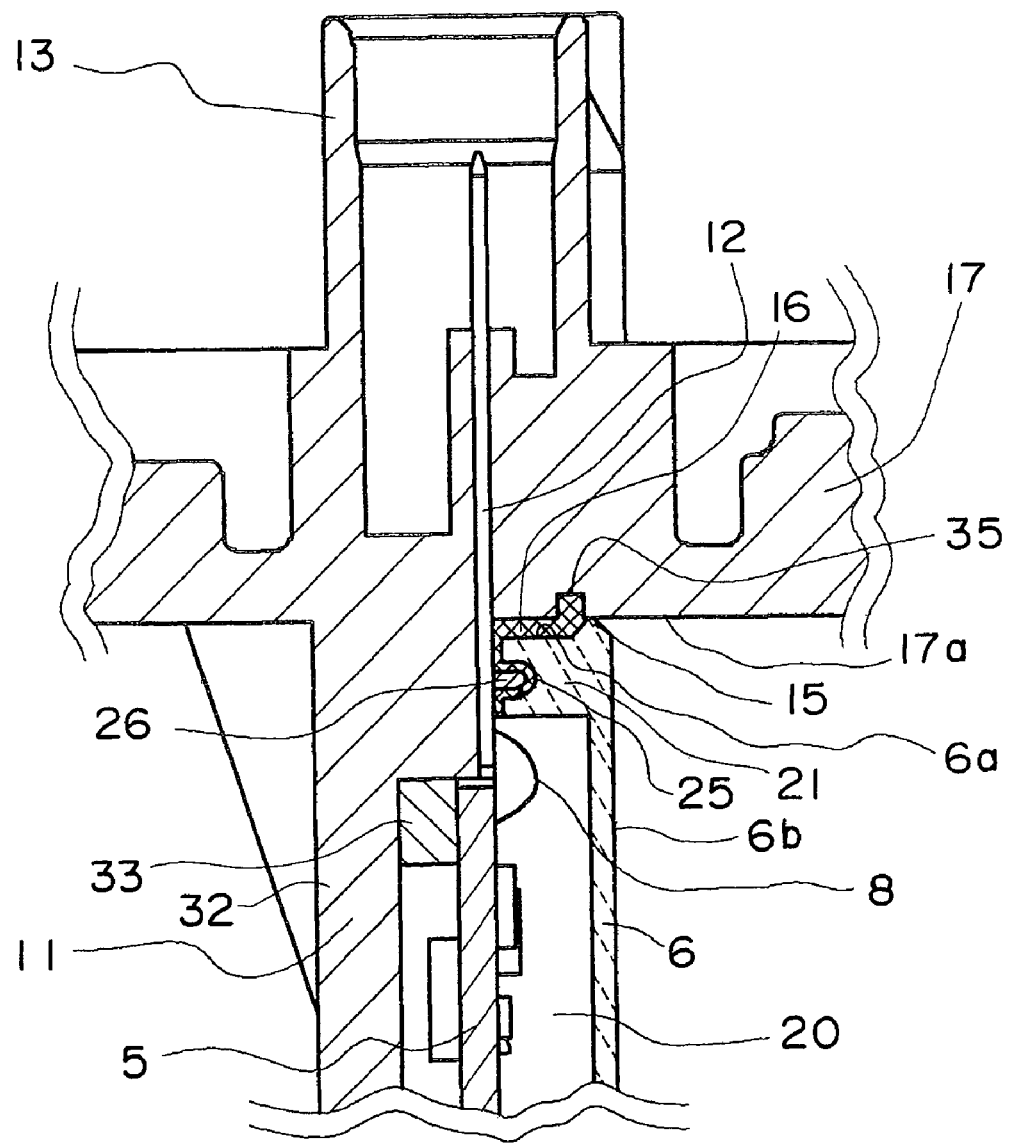
FIG. 15 is a longitudinal sectional view of a flow rate measuring apparatus according to Embodiment 6 of the present invention as viewed from an upstream side.

FIG. 15 is a cross sectional view of a principal part of the flow rate measuring apparatus 1 according to Embodiment 6 of the present invention.

In Embodiment 6, an adhesive collecting portion 35 corresponding to the leakage preventing means is formed on the inner wall surface 17a of the flange 17 on the inner side of the projecting portion 15.

The remaining configuration is the same as the flow rate measuring apparatus 1 of Embodiment 5.

In the flow rate measuring apparatus 1, the adhesive collecting portion 35 is formed on the inner wall surface 17a of the flange 17 on the inner side of the projecting portion 15. Therefore, in comparison with the flow rate measuring apparatus 1 of Embodiment 5, the leakage of the silicone adhesive onto the surface 6b of the cover 6 is further reduced.

Note that, the adhesive collecting portion 35 may alternatively be formed on the outer circumferential wall surface 6a of the cover 6.

In the embodiments described above, the flow rate measuring apparatus 1 provided inside the intake pipe 50 of the internal combustion engine has been described. However, it is apparent that the application of the present invention is not limited thereto. For example, the present invention is also applicable to a flow rate measuring apparatus which is, for example, provided inside an exhaust pipe of the internal combustion engine to measure a flow rate of an exhaust gas.

The intake pipe 50 may be configured integrally with an intake air filtering apparatus (not shown).

Further, each of the plate 10 and the base 11 is constituted by an independent member. However, a set of the plate 10 and the base 11 may be constituted by a single member. By constituting the set of the plate 10 and the base 11 by the single member, advantages are provided in terms of component management, handling of components in the fabrication process, and the like.

Further, the means for connecting the circuit board 5 and the terminals 12 by the wires 8 and the means for connecting the circuit board 5 and the flow rate detection element 2 by the wires 8 may be other than the wire bonding and may be, for example, welding or soldering.

Further, each of the flow rate detection resistor 3 and the temperature compensation resistor 4 is formed by patterning (not shown) a platinum film on a surface of an insulating substrate made of silicon or ceramic. However, a material of the film is not limited to platinum and may be, for example, nickel or permalloy.

What is claimed is:

1. A flow rate measuring apparatus installed by being inserted into an apparatus insertion hole provided to a pipe, for measuring a flow rate of a fluid to be measured passing through a pipe passage, the flow rate measuring apparatus comprising:

a base made of a resin, including:
   a base main body including a connector formed at a base end portion of the base main body so as to project to outside of the pipe; and
   a flange provided so as to radially extend from the base main body to be fitted into the apparatus insertion hole;
a plate provided so as to partially overlap the base main body;

a flow rate detection element provided on the plate in an exposed manner, for detecting the flow rate of the fluid to be measured;

a circuit board provided on the plate on a side close to the connector, which includes a control circuit for processing a signal from the flow rate detection element;

a cover made of a resin, including:
 a circuit housing portion covering the circuit board; and
 a fluid passage groove for forming a measurement passage in cooperation with the plate;

wires provided inside the circuit housing portion, for electrically connecting the connector and the circuit board to each other; and deformation suppression means provided between an inner wall surface of the flange and an outer circumferential wall surface of the cover, the outer circumferential wall surface being opposed to the inner wall surface, for connecting the flange and the cover to each other to suppress deformation of the base main body due to vibration of the pipe.

2. A flow rate measuring apparatus according to claim 1, wherein the deformation suppression means comprises a bonding portion formed by curing an adhesive.

3. A flow rate measuring apparatus according to claim 1, wherein the deformation suppression means comprises a welded portion in which the inner wall surface of the flange and the outer circumferential wall surface of the cover are welded to each other.

4. A flow rate measuring apparatus according to claim 1, wherein the deformation suppression means comprises a projecting portion which is formed on at least one of the inner wall surface of the flange and the outer circumferential wall surface of the cover and is plastically deformed by depression.

5. A flow rate measuring apparatus according to claim 1, wherein each of the wires has two end portions electrically connected respectively to the connector and the circuit board by wire bonding.

6. A flow rate measuring apparatus according to claim 2, wherein the adhesive comprises an epoxy adhesive.

7. A flow rate measuring apparatus according to claim 6, wherein the adhesive further comprises a low-stiffness adhesive having lower stiffness than stiffness of the epoxy adhesive after being cured, the low-stiffness adhesive being applied and cured between an enclosure portion forming the circuit housing portion of the cover and the base main body opposed to the enclosure portion.

8. A flow rate measuring apparatus according to claim 7, wherein the epoxy adhesive and the low-stiffness adhesive are applied so as to be separated away from each other.

9. A flow rate measuring apparatus according to claim 8, further comprising:
 a groove to be filled with the epoxy adhesive, which is formed in the cover on a side closer to the flange so as to extend in parallel to the inner wall surface of the flange;
 a bonding rib projecting from the base main body and loosely inserted into the groove;
 a groove to be filled with the low-stiffness adhesive, which is formed in the cover on a side closer to the circuit board over an entire circumference along the enclosure portion of the cover; and
 a bonding rib projecting from the base main body and loosely inserted into the groove.

10. A flow rate measuring apparatus according to claim 7, wherein the epoxy adhesive comprises an adhesive containing an epoxy resin using a non-amine curing agent as a main component, and the low-stiffness adhesive comprises a thermosetting silicone adhesive.

11. A flow rate measuring apparatus according to claim 10, wherein the non-amine curing agent comprises a latent curing agent.

12. A flow rate measuring apparatus according to claim 4, wherein the projecting portion has a distal end portion having one of an acute-angle projection shape and an arc-like projection shape.

13. A flow rate measuring apparatus according to claim 2, further comprising leakage preventing means for preventing the adhesive in an uncured state from leaking to the outside, the leakage preventing means being provided on one of the inner wall surface of the flange and the outer circumferential wall surface of the cover so as to be closer to a side of the bonding portion, the side being opposite to the base main body.

14. A flow rate measuring apparatus according to claim 13, wherein the leakage preventing means comprises an adhesive collecting portion in which the adhesive is collected.

15. A flow rate measuring apparatus according to claim 13, wherein the leakage preventing means comprises a projecting portion for preventing outflow of the adhesive.

16. A flow rate measuring apparatus according to claim 15, wherein a plurality of the projecting portions are provided to form a labyrinth structure.

17. A flow rate measuring apparatus according to claim 1, wherein a set of the plate and the base are constituted by a single member.

18. A flow rate measuring apparatus according to claim 1, wherein the pipe comprises an intake pipe of an internal combustion engine, and the fluid to be measured comprises air.

* * * * *